US012608110B2

(12) United States Patent
Huang et al.

(10) Patent No.: US 12,608,110 B2
(45) Date of Patent: Apr. 21, 2026

(54) MULTIPOINT TOUCH AND HOVER TOUCH-COMPATIBLE SENSING DEVICE AND SENSING METHOD THEREOF

(71) Applicant: NOVATEK Microelectronics Corp., Hsin-Chu (TW)

(72) Inventors: Pin-Wei Huang, Hsinchu County (TW); Hsin-Ting Chan, Hsinchu City (TW); Ding-Teng Shih, Hsinchu City (TW); Shi-Hao Huang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/813,084

(22) Filed: Aug. 23, 2024

(65) Prior Publication Data

US 2026/0056636 A1     Feb. 26, 2026

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04101* (2013.01)

(58) Field of Classification Search
CPC . G06F 2203/04101; G06F 2203/04809; G06F 3/041661; G06F 3/0443; G06F 3/0446; G06F 3/0448; G06F 3/04886
See application file for complete search history.

(56) References Cited

U.S. PATENT DOCUMENTS

| | | | | |
|---|---|---|---|---|
| 2014/0062951 A1* | 3/2014 | Chang | .................. | G06F 3/0442 |
| | | | | 345/174 |
| 2016/0313843 A1* | 10/2016 | Vanga | .................. | G06F 3/0446 |
| 2016/0357328 A1 | 12/2016 | Hu | | |

FOREIGN PATENT DOCUMENTS

| | | |
|---|---|---|
| CN | 105739794 A | 7/2016 |
| TW | 201239717 A1 | 10/2012 |
| TW | 201439830 A | 10/2014 |

* cited by examiner

*Primary Examiner* — Robin J Mishler
(74) *Attorney, Agent, or Firm* — Winston Hsu

(57) ABSTRACT

A sensing device includes a touch panel and a control circuit coupled to the touch panel. The touch panel includes touch sensors arranged in a matrix of x columns and y rows, and is used to generate touch data upon being scanned. The control circuit is used to scan the touch panel and differentiate between a normal touch event and a hover touch event according to the touch data.

25 Claims, 11 Drawing Sheets

MULTIPOINT TOUCH AND HOVER TOUCH-COMPATIBLE SENSING DEVICE AND SENSING METHOD THEREOF

BACKGROUND OF THE INVENTION

1. Field of the Invention

The invention is related to touch sensing techniques, especially related to a multipoint touch and hover touch-compatible sensing device and a sensing method thereof.

2. Description of the Prior Art

The evolving technology has led to the integration of touch panels in various electronic devices, enhancing their user interface. Yet, there is a need for touch panels to accommodate hover touch operations, particularly when normal touch operations are not the preferred choice for users of the electronic devices.

SUMMARY OF THE INVENTION

According to one embodiment of the invention, a sensing device includes a touch panel and a control circuit coupled to the touch panel. The touch panel includes touch sensors arranged in a matrix of x columns and y rows, x and y being positive integers exceeding 1. The touch panel is used to generate touch data upon being scanned. The control circuit is used to scan the touch panel and differentiate between a normal touch event and a hover touch event according to the touch data.

According to another embodiment of the invention, a sensing method includes a touch panel generating touch data upon being scanned, wherein the touch panel comprises touch sensors arranged in a matrix of x columns and y rows, x and y being positive integers exceeding 1. Further, the method includes a control circuit scanning the touch panel and differentiating between a normal touch event and a hover touch event according to the touch data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
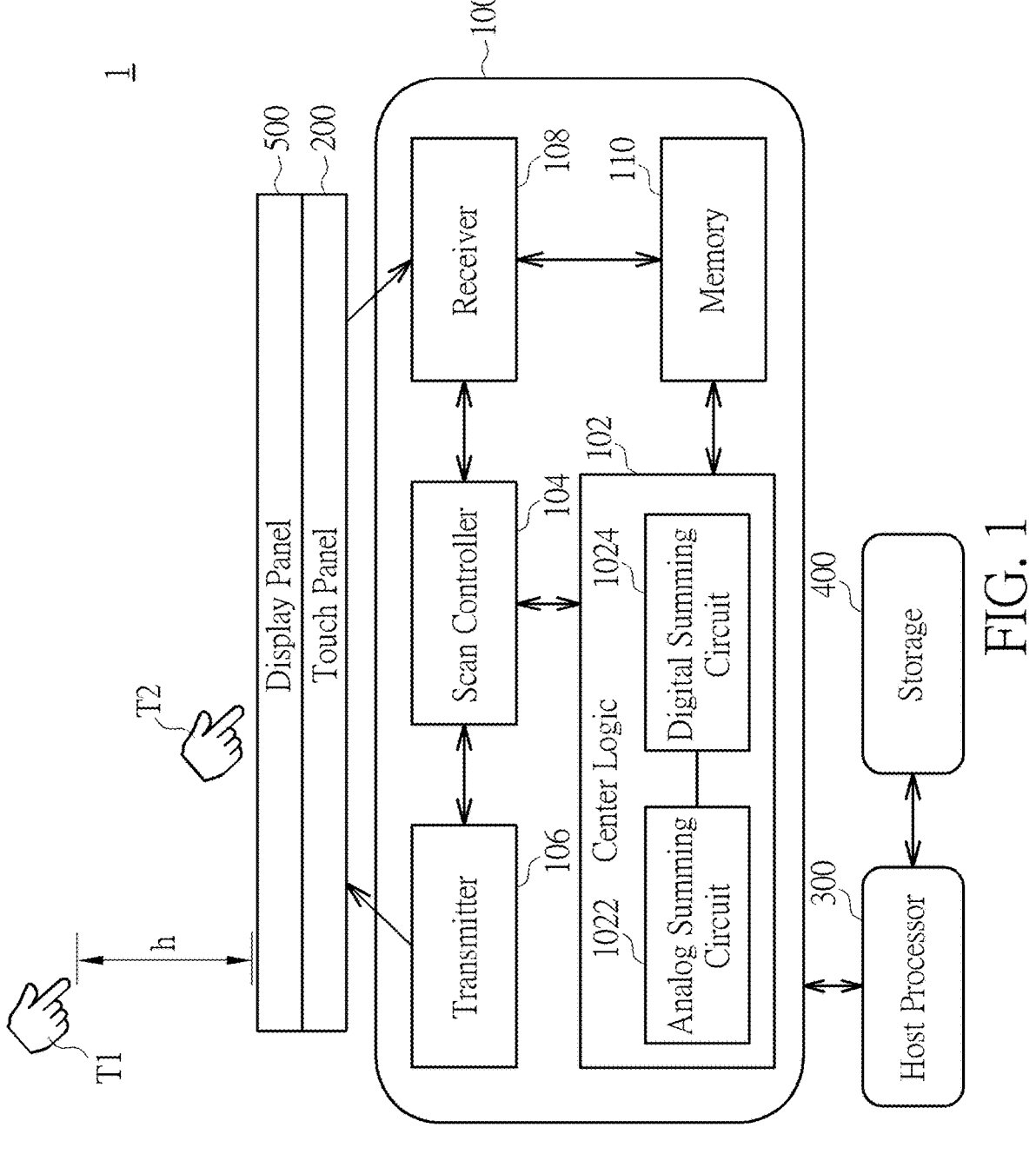
FIG. 1 is a schematic diagram of a sensing device according to an embodiment of the invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 depicts a sensing device 1 including a control circuit 100, a touch panel 200, a host processor 300, a storage device 400, and a display panel 500. The control circuit 100 may include a center logic 102, a scan controller 104, a transmitter 106, a receiver 108, and a memory 110. The touch panel 200 may be capacitive touch panel. The display panel 500 may be an organic light-emitting diodes (OLED) display panel or a liquid crystal display (LCD) panel. The storage device 400 and the memory 110 may be non-volatile memory. The center logic 102 may include an analog summing circuit 1022 and a digital summing circuit 1024. The sensing device 1 may be integrated with an electronic device that is controlled by both a normal touch event T2 and a hover touch event T1. The normal touch event T2 may be either a single-point touch or a multipoint touch.

The touch panel 200 may generate touch data upon being scanned, and the control circuit 100 may be coupled to the touch panel 200 to scan the touch panel 200 and differentiate between the hover touch event T1 and the normal touch event T2. The hover touch event T1 refers to the touch event on the sensing device 1, which is positioned at a distance h from the display panel 500, where h is a positive value exceeding 0. The normal touch event T2 refers to the touch event on the sensing device 1 that is in direct contact with the display panel 500.

Elements of the control circuit 100 are described as follows: the transmitter 106 may transmit a scan signal to scan the touch panel 200; the scan controller 104 may generate the scan signal; the receiver 108 may receive the touch data generated by the touch panel 200 in response to the scan signal; the memory 110 may store the touch data; and the center logic 102 may process the touch data and determine a location, a movement and/or status of the hover touch event T1 and the normal touch event T2.

When processing the touch data, the analog summing circuit 1022 may perform an analog accumulation of the touch data and the digital summing circuit 1024 may perform a digital accumulation of the touch data, enhancing the signal-to-noise ratio of the touch data, thereby boosting the touch sensitivity.

The control circuit 100 may be further coupled to the host processor 300, and the display panel 500, and the host processor 300 may be coupled to the storage device 400. The host processor 300 may execute an application stored in the storage device 400. The application may be the device driver of the control circuit 100, and/or a program generating images to be displayed on the display panel 500 according to the normal touch event T2 and/or the hover touch event T1.

Figure 2:
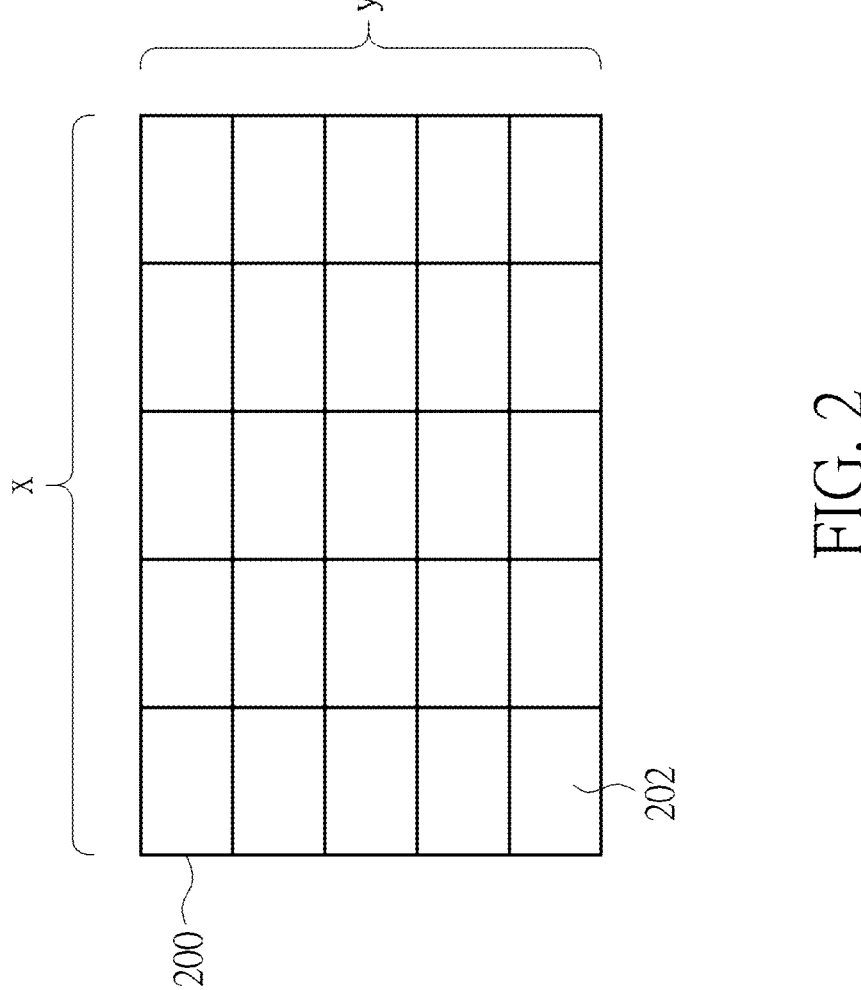
FIG. 2 is a schematic diagram of a touch panel of the sensing device in FIG. 1.

FIG. 2 depicts a schematic diagram of the touch panel 200. The touch panel 200 may include x×y touch sensors 202 arranged in a matrix of x columns and y rows, x and y being positive integers exceeding 1. The touch data may include one-dimensional (1D) touch data and/or two-dimensional (2D) touch data according to how the x×y touch sensors 202 are scanned. If the transmitter 106 transmits a scan signal including 1D scan pattern, the receiver 108 may receive the a 1D touch data; whereas if the transmitter 106 transmits a scan signal including a 2D scan pattern, the receiver 108 may receive the 2D touch data. The 1D touch data may be used to sense the hover touch event T1, and each piece of 1D touch data may correspond to a touch value of a column or a row of touch sensors 202. The 2D touch data may be used to sense the normal touch event T2, and each piece of the 2D touch data may correspond to a touch value of a particular touch sensor 202 of the x×y touch sensors 202. The touch value may represent the amount of capacitive coupling between the touch sensor(s) 202 and a stimulus, such as a finger or a stylus pen. A stronger capacitive coupling, which occurs when the stimulus is very close or in direct contact with the touch sensor(s) 202, leads to a higher touch value.

Figures 3A, 3B, 3C:
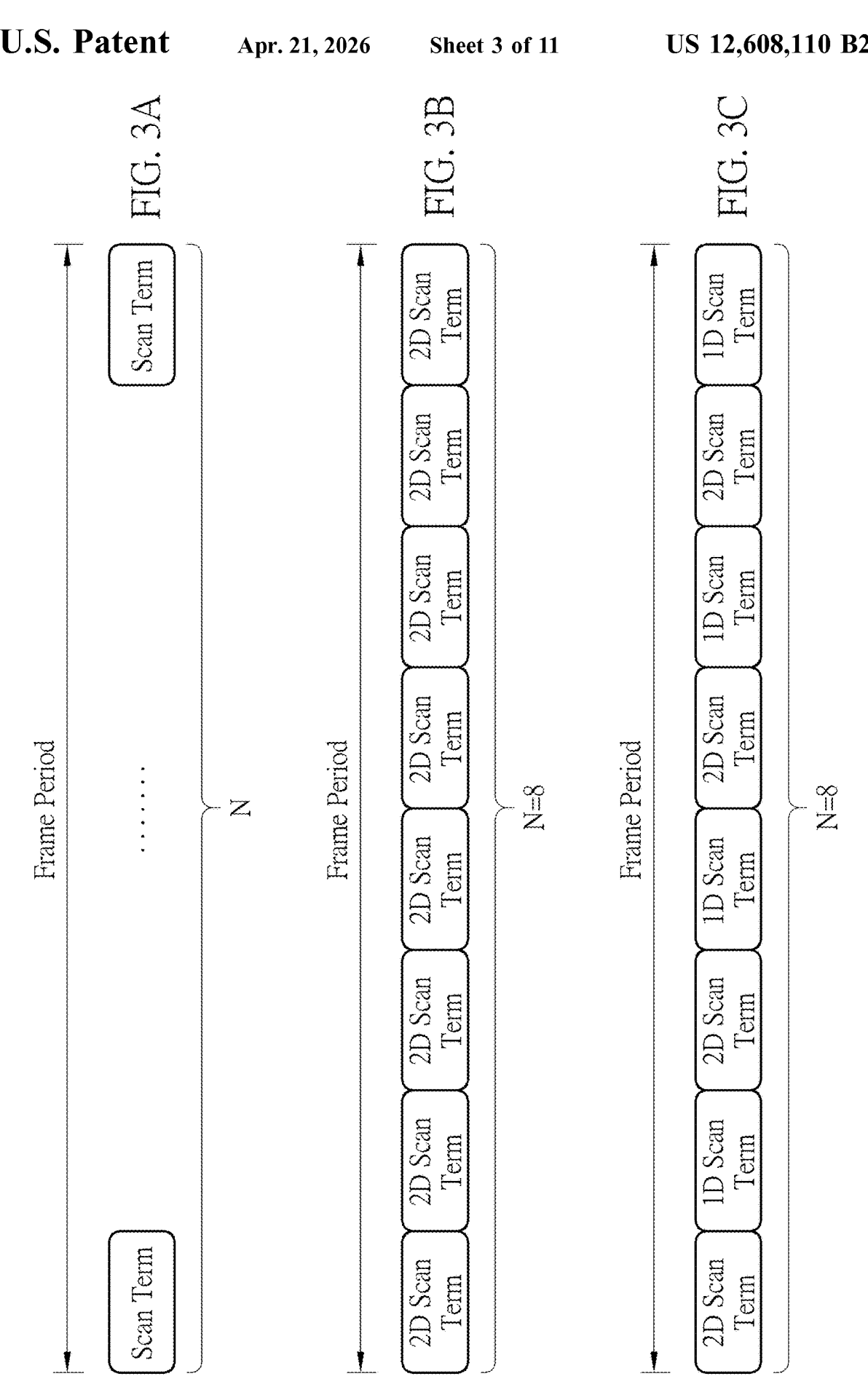
FIGS. 3A to 3C are schematic diagrams of data formats of touch data in a touch period.
Figures 4A, 4B:
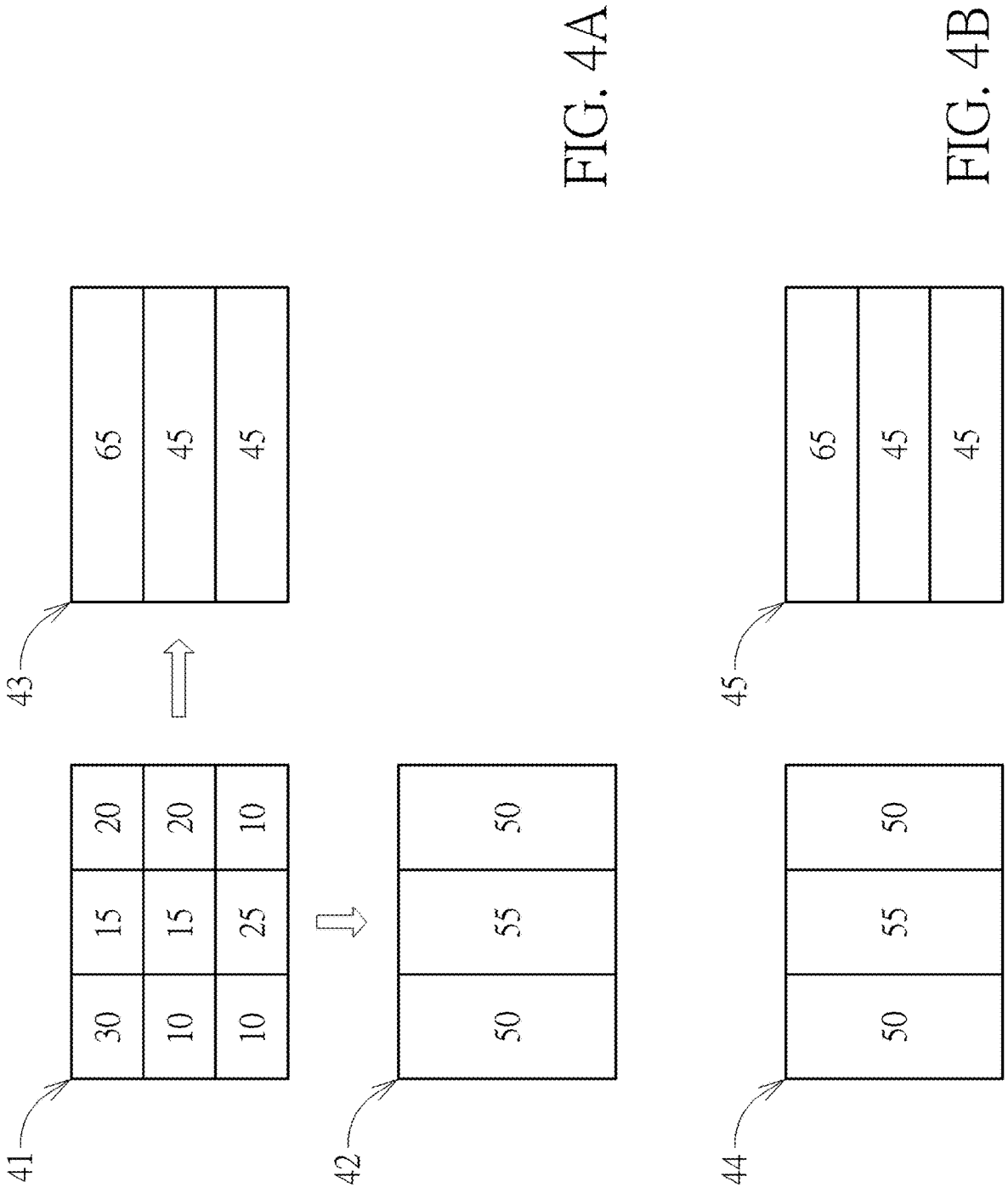
FIG. 4A and FIG. 4B are schematic diagrams illustrating how the control circuit in FIG. 1 obtains the 1D touch data according to the data formats in FIGS. 3B and 3C, respectively.

FIGS. 3A to 3C show schematic diagrams of data formats of touch data in a touch period, and FIGS. 4A and 4B show how the control circuit 100 obtains the 1D touch data according to the data formats in FIGS. 3B and 3C, respectively. In FIG. 3A, the touch panel 200 may be scanned in a frame period comprising N scan terms, N being a positive integer exceeding 1. In some embodiments, the touch panel 200 may be fully scanned in the frame period. That is, the x×y touch sensors 202 are scanned to generate the 1D touch data and/or the 2D touch data. In some embodiments, a noise detection (ND) term (not shown) may also be inserted between the N scan terms of the frame period, such that noise on the touch panel 200 may be detected to avoid miss identification of the hover touch event T1 and/or the normal touch event T2.

In FIG. 3B, the frame period may include N 2D scan terms. Thus, the control circuit 100 may first obtain the 2D touch data during the N 2D scan terms, and then accumulate the 2D touch data into the 1D touch data. In some embodiments, the control circuit 100 may scan a touch sensor of the touch sensors multiple times to generate raw touch data of the touch sensor, the analog summing circuit 1022 may accumulate the raw touch data of the touch sensor to generate analog touch data of the touch sensor during a scan term, and the digital summing circuit 1024 may accumulate the analog touch data of the touch sensor repeatedly to generate 2D touch data of the touch sensor during the scan term. Specifically, 1/N of the x×y touch sensors 202 may be scanned A times in each 2D scan term, generating A pieces of raw touch data for each touch sensor 202, A being an integer exceeding 1. The analog summing circuit 1022 may accumulate the A pieces of raw touch data of each touch sensor 202 to generate analog touch data of the touch sensor 202 during the 2D scan term. Subsequently, the digital summing circuit 1024 may accumulate the analog touch data of the touch sensor D times to generate 2D touch data of the touch sensor during the 2D scan term, D being an integer exceeding 1. If A=4 and D=4, each touch sensor 202 in the 1/N of the x×y touch sensors 202 may be scanned 4 times in the 2D scan term, generating 4 pieces of raw touch data for each touch sensor 202. The analog summing circuit 1022 may accumulate the 4 pieces of raw touch data to generate 1 piece of analog touch data of each touch sensor 202 during the 2D scan term, and the digital summing circuit 1024 may accumulate the piece of analog touch data of the touch sensor 4 times to generate 2D touch data of each touch sensor 202 during the 2D scan term.

In FIG. 3C, the frame period may include N/2 1D scan terms and N/2 2D scan terms. Thus, the control circuit 100 may obtain both 2D touch data and the 1D touch data alternately and directly from the touch panel 200 during the N scan terms. In some embodiments, 2/N of the x×y touch sensors 202 may be scanned A times in each 2D scan term, generating A pieces of raw touch data for each touch sensor 202, A being an integer exceeding 1. The analog summing circuit 1022 may accumulate the A pieces of raw touch data of each touch sensor 202 to generate analog touch data of the touch sensor 202 during the 2D scan term. Subsequently, the digital summing circuit 1024 may accumulate the analog touch data of the touch sensor D times to generate 2D touch data of the touch sensor during the 2D scan term, D being an integer exceeding 1. In FIG. 3C, the number of 2D scan terms is halved compared to FIG. 3B. Consequently, the number of touch sensors 202 to be scanned in each 2D scan term is doubled, leading to a decrease in the time available for the analog accumulations and/or the digital accumulations. In some embodiments, the number of analog accumulations A and the number of digital accumulations D may remain unchanged. For example, if A=2 and D=4, each touch sensor 202 in the 2/N of the x×y touch sensors 202 may be scanned 2 times in each 2D scan term, generating 2 pieces of raw touch data for each touch sensor 202. The analog summing circuit 1022 may accumulate the 2 pieces of raw touch data to generate 1 piece of analog touch data of each touch sensor 202 during the 2D scan term, and the digital summing circuit 1024 may accumulate the piece of analog touch data of the touch sensor 4 times to generate 2D touch data of each touch sensor 202 during the 2D scan term.

FIG. 3B shows that the control circuit 100 may perform 2D scans on the x×y touch sensors 202 to generate x×y pieces of 2D touch data during the N scan terms (e.g., N=8). The 2D scans may involve the control circuit 100 scanning the x×y touch sensors 202 in a column-by-column order or a row-by-row order to collect the x×y pieces of 2D touch data. Further, the control circuit 100 may accumulate the x×y pieces of 2D touch data along the vertical direction (column) to generate x pieces of 1D touch data, or accumulate the x×y pieces of 2D touch data along the horizontal direction (row) to generate y pieces of 1D touch data. The generation of the 1D touch data from the 2D touch data will be discussed with reference to FIG. 4A.

In some embodiments, the control circuit 100 may scan y touch sensors 202 in a column of the x columns to generate y pieces of 2D touch data of the column, resulting in x×y pieces of 2D touch data of the x columns. Next, the control circuit 100 may accumulate the y pieces of 2D touch data of the column to generate 1D touch data of the column, identify the hover touch event T1 according to x pieces of 1D touch data of the x columns, and identify the normal touch event T2 according to x×y pieces of 2D touch data of the x×y touch sensors 202. For example, FIG. 4A shows that 3×3=9 pieces of the 2D touch data (labeled as 41) generated by the 3×3=9 sensor cells 202 may contain values of $$\begin{bmatrix} 30 & 15 & 20 \\ 10 & 15 & 20 \\ 10 & 25 & 10 \end{bmatrix}.$$

When the 2D touch data in each of the columns are accumulated together, the generated 1D touch data (labeled as 42) may contain values of [50 55 50]. Therefore, the control circuit 100 may use the 2D touch data 41 to identify the normal touch event T2 and use the 1D touch data 42 to identify the hover touch event T1, respectively.

Since the hover touch event T1 is not directly contacting with the display panel 500, the 1D touch data from different frame periods or scan terms may be further accumulated to boost the hover touch sensitivity and increase the effective sensing distance. For example, if 8 pieces of 1D touch data from the corresponding scan terms (e.g., the first scan terms) of 8 consecutive frame periods contain the same values of [50 55 50], the control circuit 100 may accumulate the 8 pieces of 1D touch data to obtain accumulated 1D touch data containing value of [400 440 400]. The identification of the hover touch event T1 may be enhanced by utilizing the accumulated 1D touch data, leading to an extension in the effective sensing distance, an increase in hover touch responsiveness, and a boost in the detection accuracy.

In other embodiments, the control circuit 100 may scan x touch sensors 202 in a row of the y rows to generate x pieces of 2D touch data of the row, resulting in x×y pieces of 2D touch data of the y rows. Next, the control circuit 100 may accumulate the x pieces of 2D touch data of the row to generate 1D touch data of the row, identify the hover touch event T1 according to y pieces of 1D touch data of the y rows, and identify the normal touch event T2 according to x×y pieces of 2D touch data of the x×y touch sensors 202. For example, FIG. 4A shows that 3×3=9 pieces of the 2D touch data (labeled as 41) generated by the 3×3=9 sensor cells 202 may contain touch values of $$\begin{bmatrix} 30 & 15 & 20 \\ 10 & 15 & 20 \\ 10 & 25 & 10 \end{bmatrix}.$$

When the 2D touch data in each of the rows are accumulated together, the generated 1D touch data (labeled as 43) may contain values of $$\begin{bmatrix} 65 \\ 45 \\ 45 \end{bmatrix}.$$

Therefore, the control circuit 100 may use the 2D touch data 41 to identify the normal touch event T2 and use the 1D touch data 43 to identify the hover touch event T1.

Since the hover touch event T1 is not directly contacting with the display panel 500, the 1D touch data from different frame periods or scan terms may be further accumulated to boost the hover touch sensitivity and increase the effective sensing distance. For example, if 8 pieces of 1D touch data from the corresponding scan terms (e.g., the first scan terms) of 8 consecutive frame periods contain the same values of $$\begin{bmatrix} 65 \\ 45 \\ 45 \end{bmatrix},$$

the control circuit 100 may accumulate the 8 pieces of 1D touch data to obtain accumulated 1D touch data containing value of $$\begin{bmatrix} 520 \\ 360 \\ 360 \end{bmatrix}.$$

The identification of the hover touch event T1 may be enhanced by utilizing the accumulated 1D touch data, leading to an extension in the effective sensing distance, an increase in hover touch responsiveness, and a boost in the detection accuracy.

FIG. 3C shows that the control circuit 100 may perform at least one 1D scan on the x×y touch sensors 202 to generate the 1D touch data during at least one (e.g., 4) scan term of the N scan terms (e.g., N=8), and perform 2D scans on the x×y touch sensors 202 to generate the 2D touch data during remaining (e.g., 4) scan terms of the N scan terms. In some embodiments, the 1D scans may involve merging the x touch sensors 202 in each column before scanning. In other embodiments, the 1D scans may involve merging the y touch sensors 202 in each row before scanning. In some embodiments, scan term of the 1D terms may be evenly distributed among scan terms of the 2D scans, optimizing detection accuracy of both the 1D scan and the 2D scan without losing crucial 1D touch information and 2D touch information. For example, if 2 1D scans and 6 2D scans are performed in a frame period, the control circuit 100 may scan the touch panel 200 at a scan sequence of 2D scan, 2D scan, 1D scan, 2D scan, 2D scan, 1D scan, 2D scan, and 2D scan. In other embodiments, the scan term of the 1D terms may be alternated with the scan terms of the 2D scans, optimizing detection accuracy of both the 1D scan and the 2D scan without losing crucial 1D touch information and 2D touch information. The generation of the 1D touch data will be further discussed by referral to FIG. 4B.

In some embodiments, during each of the 1D terms, the y touch sensors 202 in each column of the x columns may be merged together to sense 1D touch data of each column, resulting in x pieces of 1D touch data of the x columns. Next, the control circuit 100 may identify the hover touch event T1 according to the x pieces of 1D touch data of the x columns. For example, FIG. 4B shows that when y touch sensors 202 in each column are merged together, the touch values of the 1D touch data (labeled as 44) obtained may be expressed as [50 55 50].

Since the hover touch event T1 is not directly contacting with the display panel 500, the 1D touch data from different frame periods or scan terms may be further accumulated to boost the hover touch sensitivity and increase the effective sensing distance. For example, if every column or row of the touch panel 200 is scanned in each 1D scan term, and the control circuit 100 has determined that 1D touch data yielded from each of 4 1D scan terms in the frame period contains the same values of [50 55 50], the control circuit 100 may accumulate the 4 pieces of 1D touch data to obtain accumulated 1D touch data containing values of [200 220 200]. The identification of the hover touch event T1 may be enhanced by utilizing the accumulated 1D touch data, leading to an extension in the effective sensing distance, an increase in hover touch responsiveness, and a boost in the detection accuracy.

In other embodiments, during each of the 1D terms, the x touch sensors 202 in each row of the y rows may be merged together to sense 1D touch data of each row, resulting in y pieces of 1D touch data of the y rows. Next, the control circuit 100 may identify the hover touch event T1 according to the y pieces of 1D touch data of the y rows. For example, FIG. 4B shows that when x touch sensors 202 in each row are merged together, the touch values of the 1D touch data (labeled as 45) obtained may be expressed as $$\begin{bmatrix} 65 \\ 45 \\ 45 \end{bmatrix}.$$

Since the hover touch event T1 is not directly contacting with the display panel 500, the 1D touch data from different frame periods or scan terms may be further accumulated to boost the hover touch sensitivity and increase the effective sensing distance. For example, if the control circuit 100 has determined all 4 1D scan terms in the frame period produces 1D touch data containing the same values of $$\begin{bmatrix} 65 \\ 45 \\ 45 \end{bmatrix},$$

the control circuit 100 may accumulate the 4 pieces of 1D touch data to obtain accumulated 1D touch data containing values of $$\begin{bmatrix} 260 \\ 180 \\ 180 \end{bmatrix}.$$

The identification of the hover touch event T1 may be enhanced by utilizing the accumulated 1D touch data, leading to an extension in the effective sensing distance, an increase in hover touch responsiveness, and a boost in the detection accuracy.

Figure 5A:
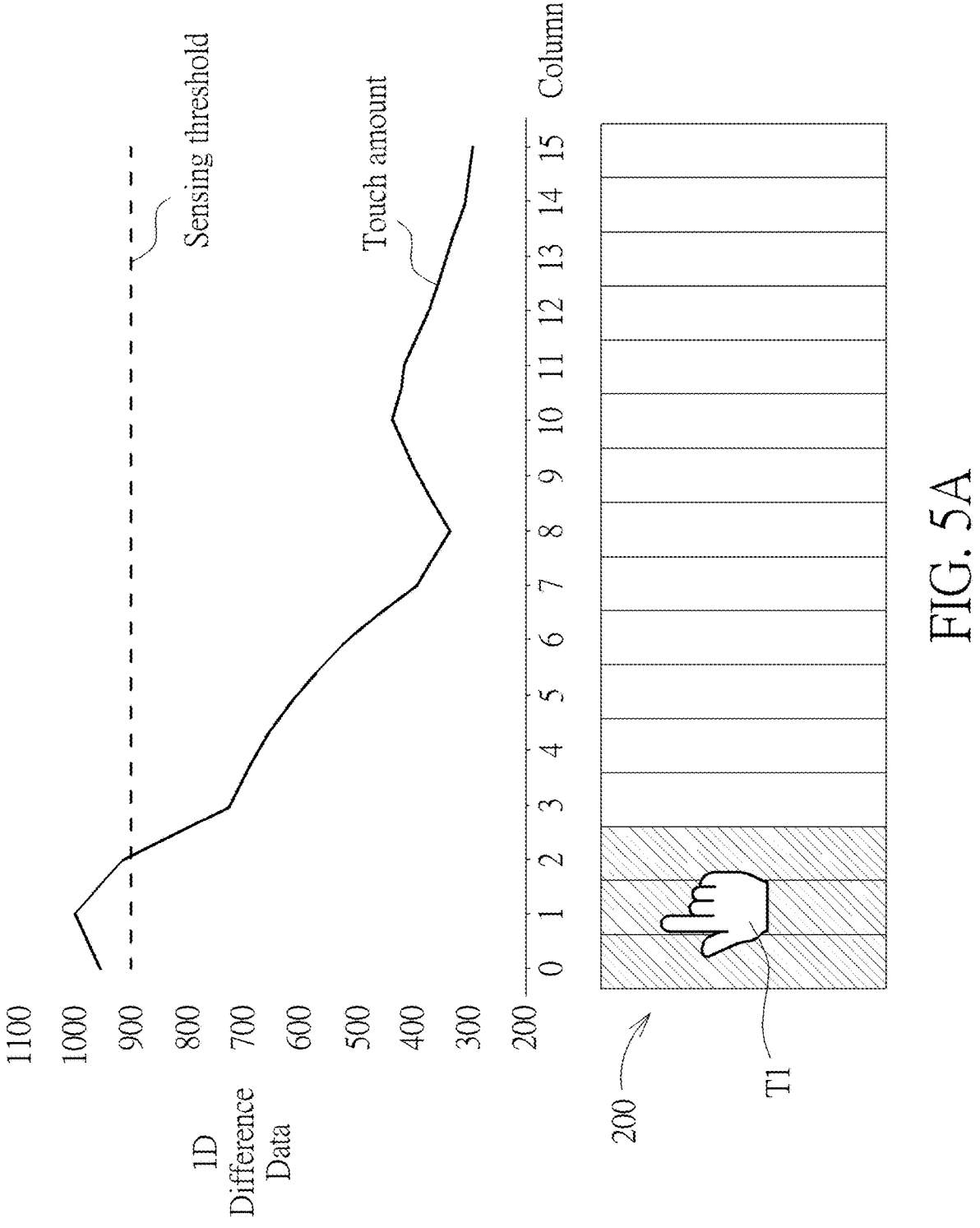
FIG. 5A and FIG. 5B are schematic diagrams illustrating embodiments of identification of candidate locations of the hover touch events.
Figure 5B:
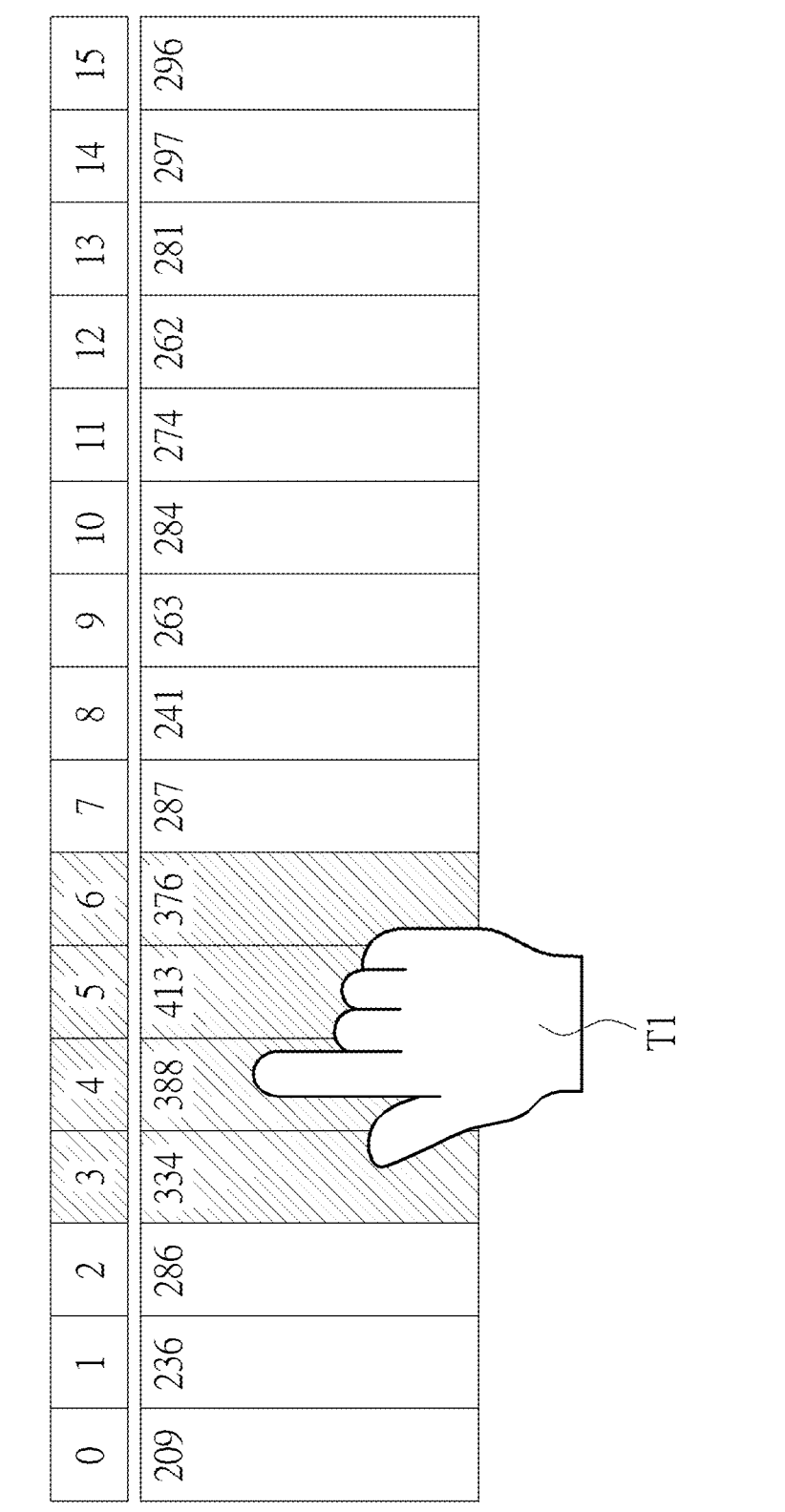

When identifying the hover touch event T1, a sensing threshold may be applied to compare with the 1D touch data to determine location of the hover touch event T1 on the touch panel 200. The sensing threshold may be a value sufficient to differentiate the 1D touch data from the noise on the touch panel 200 while ensuring a reasonable level of detection accuracy. FIGS. 5A and 5B represent first and second embodiments of the control circuit 100 identifying candidate locations of the hover touch events T1, respectively.

In the first embodiment in FIG. 5A, the control circuit 100 may compute 1D difference data of a column according to the 1D touch data of the column and baseline noise, where the baseline noise may be a threshold of ambient noise present on the touch panel 200. For example, the 1D difference data of the column may be the 1D touch data of the column minus the baseline noise. If 1D difference data of an x1-th column is greater than the sensing threshold, and 1D difference data of an x2-th column is less than the sensing threshold, the control circuit 100 may determine a location of the hover touch event T1 according to the 1D difference data of the x1-th column but not the 1D difference data of the x2-th column, x1 and x2 being different integers ranging from 1 to x. FIG. 5A shows an example for the control circuit 100 identifying the location of the hover touch event T1 according to the first embodiment. The touch panel 200 may have 16 columns of touch sensors 202, each column is indexed from 0th to 15th, and the sensing threshold is 900. When only 1D difference data of 0th column, 1st column, and 2nd column of the touch panel 200 exceed the sensing threshold, the control circuit 100 will determine that the hover touch event T1 is associated with the 0th column, 1st column, and 2nd column of the touch panel 200, and not associated with 3rd to 15th column of the touch panel 200.

In another example where each piece of 1D touch data corresponds to a row of touch sensors 202, the control circuit 100 may compute 1D difference data of a row according to the 1D touch data of the row and baseline noise. For example, the 1D difference data of the row may be the 1D touch data of the column minus the baseline noise. If 1D difference data of an y1-th row is greater than the sensing threshold, and 1D difference data of an y2-th row is less than the sensing threshold, the control circuit 100 may determine a location of the hover touch event T1 according to the 1D difference data of the y1-th column but not the 1D difference data of the y2-th column, y1 and y2 being different integers ranging from 1 to y.

For the second embodiment in FIG. 5B, the control circuit 100 may compute 1D difference data of a column according to the 1D touch data of the column and baseline noise, compares 1D difference data of the x columns with a sensing threshold to generate comparison results, selectively normalizes the 1D difference data of the x columns according to the comparison results, and generate a location of the hover touch event T1 according to the normalized 1D difference data. If K pieces of 1D difference data of K columns in the x columns are greater than the sensing threshold, the control circuit 100 may normalize the K pieces of 1D difference data of the K columns to generate K weights of the K columns, and compute a weighted sum of locations of the K columns according to the weights of the K columns to generate the location of the hover touch event T1, K being a positive integer less than x+1. For example, if x=16 and K=4, the control circuit 100 may determines that 4 columns are greater than the sensing threshold, and normalize 4 pieces of 1D difference data of the 4 columns to generate 4 weights of the 4 columns, and compute a weighted sum of locations of the 4 columns according to the weights of the 4 columns to generate the location of the hover touch event T1.

FIG. 5B shows an example for the control circuit 100 identifying the location of the hover touch event T1 according to the second embodiment. The touch panel 200 may have 16 columns of touch sensors 202, each column is indexed from 0th to 15th, and the sensing threshold is 300. When only 1D difference data of the 3rd column, 4th column, 5th column and 6th column exceed the sensing threshold, 4 pieces of 1D difference data of the 4 columns may be used to compute the location of the hover touch event T1. The 4 pieces of 1D difference data (334, 388, 413, and 376) may be normalized respectively to calculate 4 weights. Namely, the weight of the 3rd column may be expressed as $$\frac{334}{334+388+413+376} = \frac{334}{1511},$$

the weight of the 4th column may be expressed as $$\frac{388}{334+388+413+376} = \frac{388}{1511},$$

the 5th column may be expressed as $$\frac{413}{334+388+413+376} = \frac{413}{1511},$$

and the 6th column may be expressed as $$\frac{376}{334+388+413+376} = \frac{376}{1511}.$$

Therefore, the weighted sum of locations of the 3rd column, the 4th column, the 5th column and the 6th column may be calculated as $$\frac{(3\times334+4\times388+5\times413+6\times376)}{1511} = \frac{6875}{1511} = 4.54,$$

implying that the hover touch event T1 occurs between the 4th column and 5th column of touch panel 200, specifically at the point 4.54 between the 4th column and 5th column of the touch panel 200.

In another example where each piece of 1D touch data corresponds to a row of touch sensors 202, the control circuit 100 may computes 1D difference data of a row according to the 1D touch data of the row and baseline noise, compares 1D difference data of the y rows with a sensing threshold to generate comparison results, the control circuit selectively normalizes the 1D difference data of the y rows according to the comparison results, and the control circuit generates a location of the hover touch event T1 according to the normalized 1D difference data. If K pieces of 1D difference data of K rows in the y rows are greater than the sensing threshold, the control circuit 100 may normalize the K pieces of 1D difference data of the K rows to generate K weights of the K rows, and compute a weighted sum of locations of the K rows according to the weights of the K rows to generate the location of the hover touch event T1, K being a positive integer less than y+1.

In some embodiments, a noise threshold may be further applied to differentiate the hover touch event T1 from a noise induced event. The noise induced event may arise from the ambient noise on the touch panel 200 and could be mistaken as a hover touch event T1. For example, if the sum of the 1D difference data of the 3rd column, the 4th column, the 5th column, and the 6th column is less than the noise threshold, the control circuit 100 may determine that the 1D difference data of the 3rd column, the 4th column, the 5th column and the 6th column to be triggered by noise on the touch panel 200 and should not be considered as a hover touch event T1. On the other hand, if the sum of 1D difference data of the 3rd column, the 4th column, the 5th column and the 6th column is greater than the noise threshold, the control circuit 100 may determine 1D touch data sensed in the 3rd column, the 4th column, the 5th column and the 6th column to be indeed the hover touch event T1, and the location of the hover touch event T1 may be further calculated.

Upon identifying the hover touch event T1, the control circuit 100 may further determine whether the hover touch event T1 is a false detection or a valid operation according to the time criterion and/or the distance criterion. The time criterion may involve comparing a duration for which the hover touch event T1 remains at the same location with a time threshold. For example, if the hover touch event T1 at the same location does not last longer than the time threshold, the hover touch event T1 may be considered a false detection. The distance criterion may involve comparing a distance that the hover touch event T1 moves across the touch panel with a distance threshold. For example, if the hover touch event T1 does not traverse a distance greater than the distance threshold, the hover touch event T1 may also be considered a false detection. If the hover touch event T1 does not meet the time criterion and/or the distance criterion, the hover touch event T1 may be a false detection due to environmental factors (e.g., dust, moisture, ambient noise) or hardware issues. In such cases, the control circuit 100 may disregard the hover touch event T1, preventing any unintended actions from being triggered.

Figures 6A, 6B:
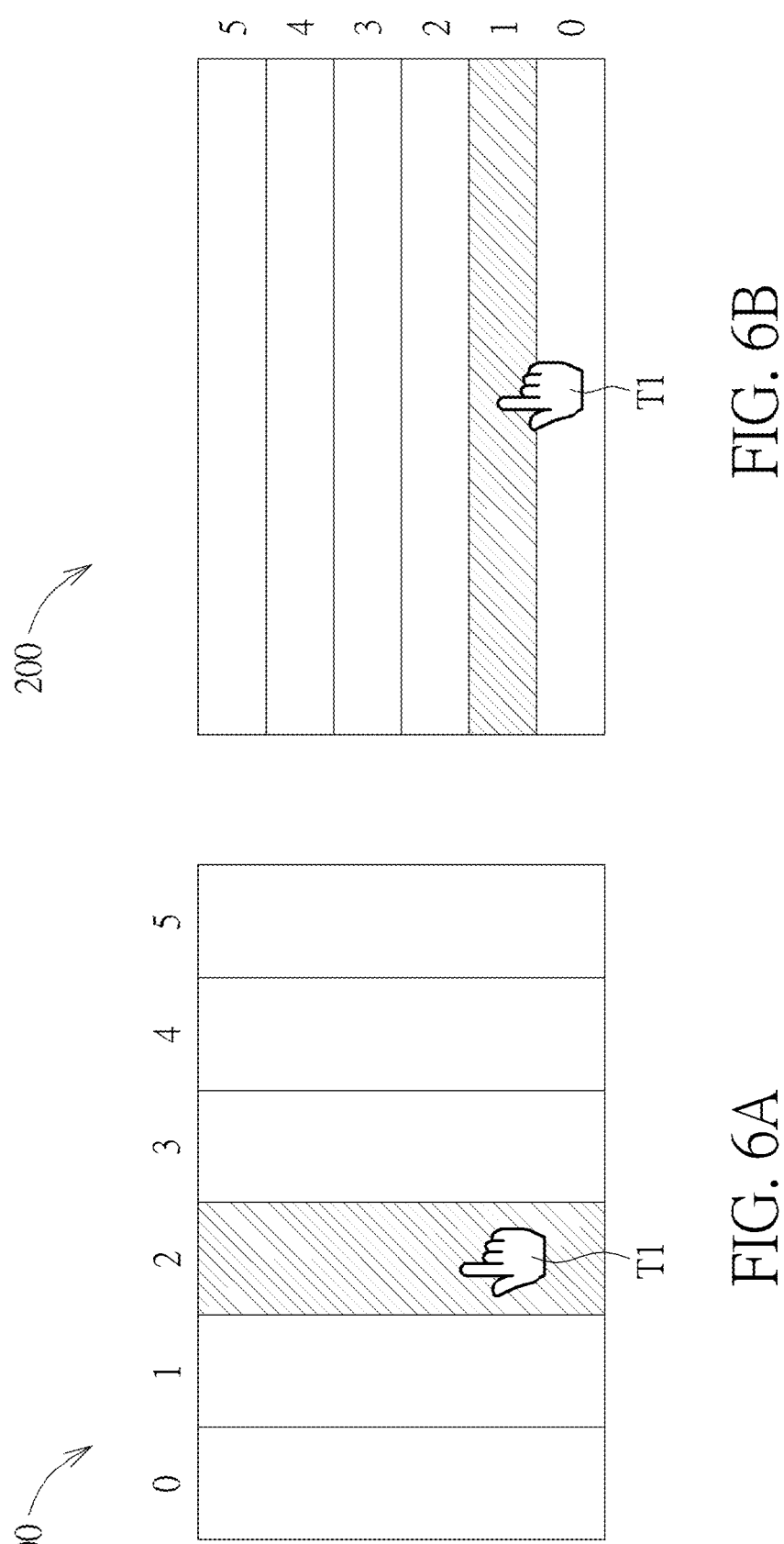
FIG. 6A and FIG. 6B are schematic diagrams illustrating other embodiments of identifying the hover control operation according to the time criterion.
Figures 7A, 7B:
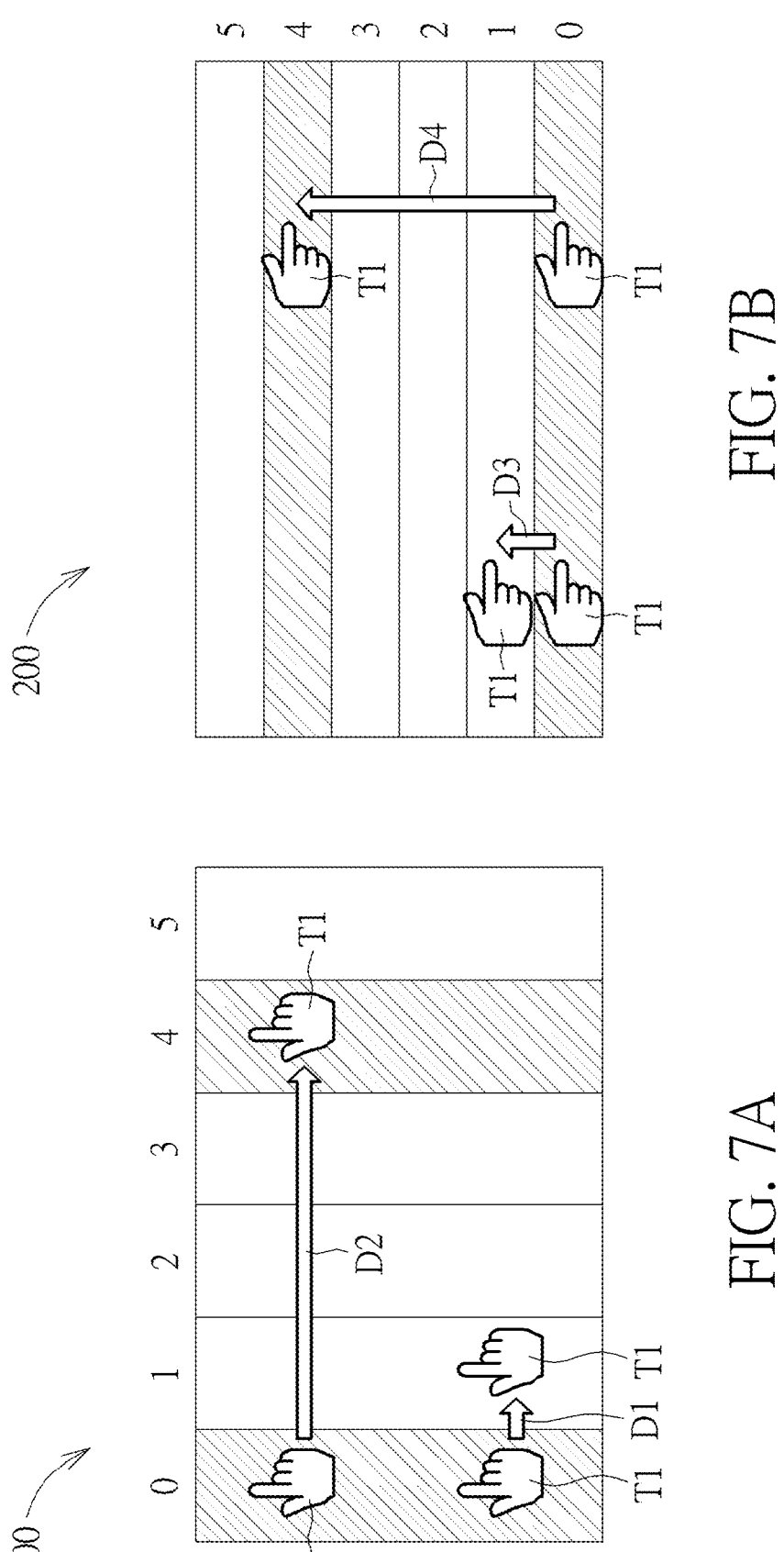
FIG. 7A and FIG. 7B are schematic diagrams illustrating other embodiments of identifying the hover sliding operation according to the distance criterion.

If the hover touch event T1 meets the time criterion or the distance criterion, the hover touch event T1 may be a valid operation. The valid operation may be a hover control operation or a hover sliding operation. FIGS. 6A and 6B represents the control circuit 100 identifying the hover control operation according to the time criterion. FIGS. 7A and 7B represents the control circuit 100 identifying the hover sliding operation according to the distance criterion.

In some embodiments, the control circuit 100 may distinguish the hover control operation according to the time criterion. The time threshold may be a predetermined number of consecutive frame periods. The control circuit 100 may determine that the hover touch event T1 corresponds to a hover control operation, according to locations of the hover touch event. If locations of the hover touch event T1 remain unchanged over the predetermined number of consecutive frame periods, the control circuit 100 may determine that the hover touch event T1 corresponds to the hover control operation. FIG. 6A shows an example for the control circuit 100 identifying the hover control operation according to the time criterion. The touch panel 200 may have 6 columns of touch sensors 202 and each column is indexed from 0th to 5th. When the control circuit 100 determined that the locations of the hover touch event T1 remain at the 2nd column of the touch panel 200 for over a predetermined number (e.g., 10) of consecutive frame periods, the control circuit 100 further determines the hover touch event T1 to be a hover control operation associated with the 2nd column of the touch panel 200.

For the hover control operation, in another example where each piece of 1D touch data corresponds to a row of touch sensors 202, the hover touch event T1 may be determined through the following steps: if locations of the hover touch event T1 remain unchanged over a predetermined number of consecutive frame periods, the control circuit 100 determines that the hover touch event T1 corresponds to a hover control operation. FIG. 6B shows an example for the control circuit 100 identifying hover control operation according to the hover touch event T1. The touch panel 200 may have 6 rows of touch sensors 202 and each row is indexed from 0th to 5th. When the control circuit 100 determined that the locations of the hover touch event T1 remain at the 1st row of the touch panel 200 for over a predetermined number (e.g., 10) of consecutive frame periods, the control circuit 100 further determines the hover touch event T1 to be a hover control operation associated with the 1st row of the touch panel 200.

For the hover sliding operation, in an example where each piece of 1D touch data corresponds to a column of touch sensors 202, the control circuit 100 may determine that the hover touch event T1 corresponds to a hover sliding operation, according to a distance of a trajectory connecting locations of the hover touch event over consecutive frame periods, a distance threshold, and a direction of the trajectory. In some embodiments, if a distance of a trajectory connecting locations of the hover touch event T1 over consecutive frame periods exceeds a distance threshold and a direction of the trajectory remains consistent, the control circuit 100 may determine that the hover touch event T1 corresponds to a hover sliding operation. FIG. 7A shows an example for the control circuit 100 identifying hover sliding operation at least according to the distance criterion. The touch panel 200 may have 6 columns of touch sensors 202 and each column is indexed from 0th to 5th. In one example, if the distance threshold is one-third of the 6 columns of the touch panel 200, the control circuit 100 may determine, throughout 10 consecutive frame periods, if the trajectory connecting locations of the hover touch event T1 has exceed one-third of the 6 columns of the touch panel 200. If the trajectory connecting locations of the hover touch event T1 has a distance D1 under the distance threshold, the control circuit 100 may further determine the hover touch event T1 not associated with a hover sliding operation. If the trajectory connecting locations of the hover touch event T1 has a distance D2 over the distance threshold and has a consistent trajectory direction moving from 0th column to 4th column, the control circuit 100 then further determines the hover touch event T1 to be a hover sliding operation.

For the hover sliding operation, in another example where each piece of 1D touch data corresponds to a row of touch sensors 202, the hover touch event T1 may be determined through the following steps: if a distance of trajectory connecting locations of the hover touch event T1 over consecutive frame periods exceeds a distance threshold and a direction of the trajectory remains consistent, the control circuit 100 determines that the hover touch event T1 corresponds to a hover sliding operation. FIG. 7B shows an example for the control circuit 100 identifying hover sliding operation at least according to the distance criterion. The touch panel 200 may have 6 rows of touch sensors 202 and each row is indexed from 0th to 5th. The control circuit 100 may determine, throughout 10 consecutive frame periods, if the trajectory connecting locations of the hover touch event T1 has exceed a distance threshold set by one-third of the 6 rows of the touch panel 200. If the trajectory connecting locations of the hover touch event T1 has a distance D3 under the distance threshold, the control circuit 100 may further determine the hover touch event T1 not associated with a hover sliding operation. If the trajectory connecting locations of the hover touch event T1 has a distance D4 over the distance threshold and has a consistent trajectory direction moving from 0th row to 4th row, the control circuit 100 then further determines the hover touch event T1 to be a hover sliding operation.

In the example described in FIGS. 7A and 7B, since the hover sliding operation will not be shown on the display panel 500 until a trajectory connecting locations of the hover touch event T1 has passed the distance threshold, a point compensation algorithm may be further applied to the control circuit 100 to sync display on the display panel 500 with the movement of the hover sliding operation. The point compensation algorithm may be expressed as follows: where $$\text{Point}_{Generated} = \text{Point}_{Entered} + \text{Compensations},$$

Compensations =

$$\frac{(TotalDividend - CurrentIndex) \times (\text{Point}_{Triggered} - \text{Point}_{Entered})}{TotalDividend},$$

$\text{Point}_{Generated}$ represents a compensation location on the touch panel 200, $\text{Point}_{Entered}$ represents a current location on the touch panel 200 when a hover sliding operation is identified, $\text{Point}_{triggered}$ represents the starting location of the hover sliding operation on the touch panel 200, TotalDividend correspond to the number of consecutive frame periods required to identify the hover sliding operation, backtracking the trajectory connecting locations of the hover sliding operation, CurrentIndex represents a current index of Total-Dividend.

The calculation of $\text{Point}_{Generated}$ using point compensation algorithm is explained through a scenario set as follows: the touch panel 200 has 5 columns of touch sensors 202 and each of the columns are indexed from 1st to 5th; the number of consecutive frame periods required by the control circuit 100 to identify the hover sliding operation is set as more than 2; the control circuit 100 has determined the hover touch event T1 to be moving from the 1st column to the 5th column during 3 consecutive frame periods. As the result, $\text{Point}_{Entered}$ may be set as 5, $\text{Point}_{triggered}$ may be set as 1, and TotalDividend may be set as 3. Therefore, the compensation location at 2nd frame period of the 3 consecutive frame periods may be calculated as $$\text{Point}_{Generated} = 5 + \frac{(3-2) \times (1-5)}{3} = 3\frac{2}{3},$$

the compensation location at 1st frame period of the 3 consecutive frame period may be calculated as $$\text{Point}_{Generated} = 5 + \frac{(3-1) \times (1-5)}{3} = 2\frac{1}{3},$$

and the compensation location at the 0th frame period where the $\text{Point}_{triggered}$ is identified may be calculated as $$\text{Point}_{Generated} = 5 + \frac{(3-0) \times (1-5)}{3} = 1 = \text{Point}_{triggered}.$$

Upon obtaining the compensation locations of the hover sliding operation, the control circuit 100 may further instruct the display panel 500 to display the over sliding operation in accordance with the trajectory connecting locations, such that user will not perceive the display of hover sliding operation as delayed display, hence improve the user experience.

Figure 8:
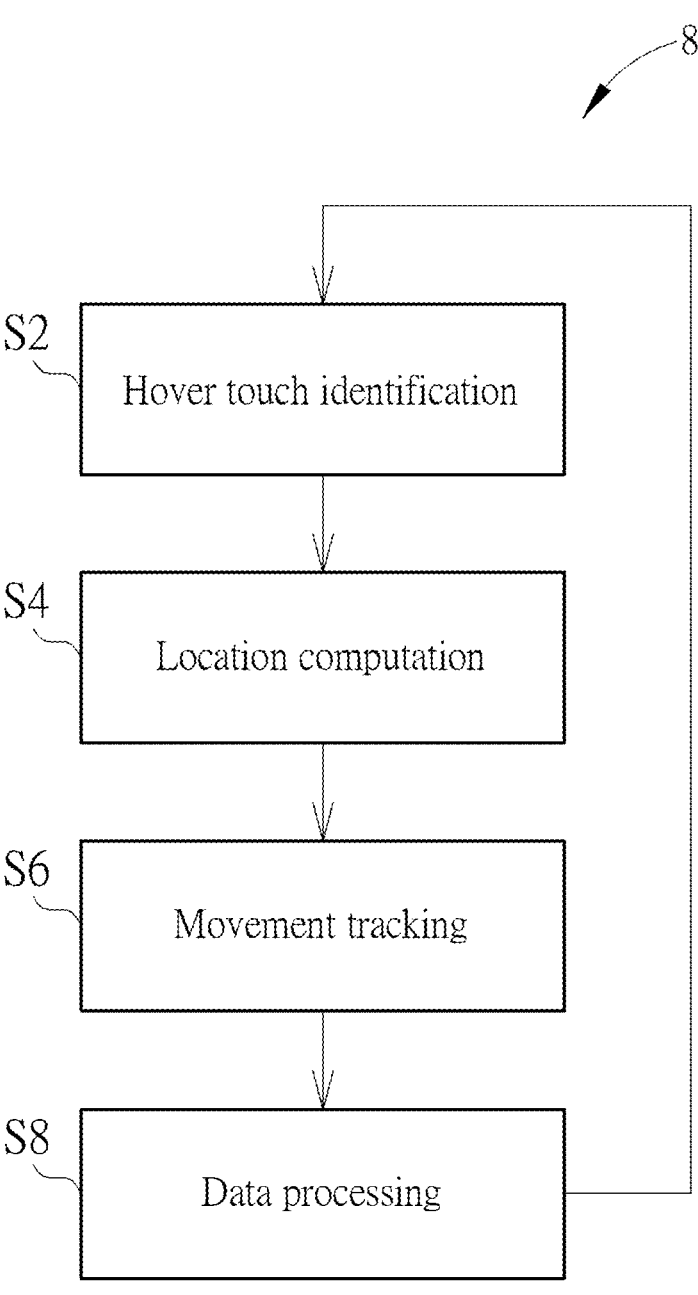
FIGS. 8 to 10 are flowcharts of the sensing method.
Figure 9:
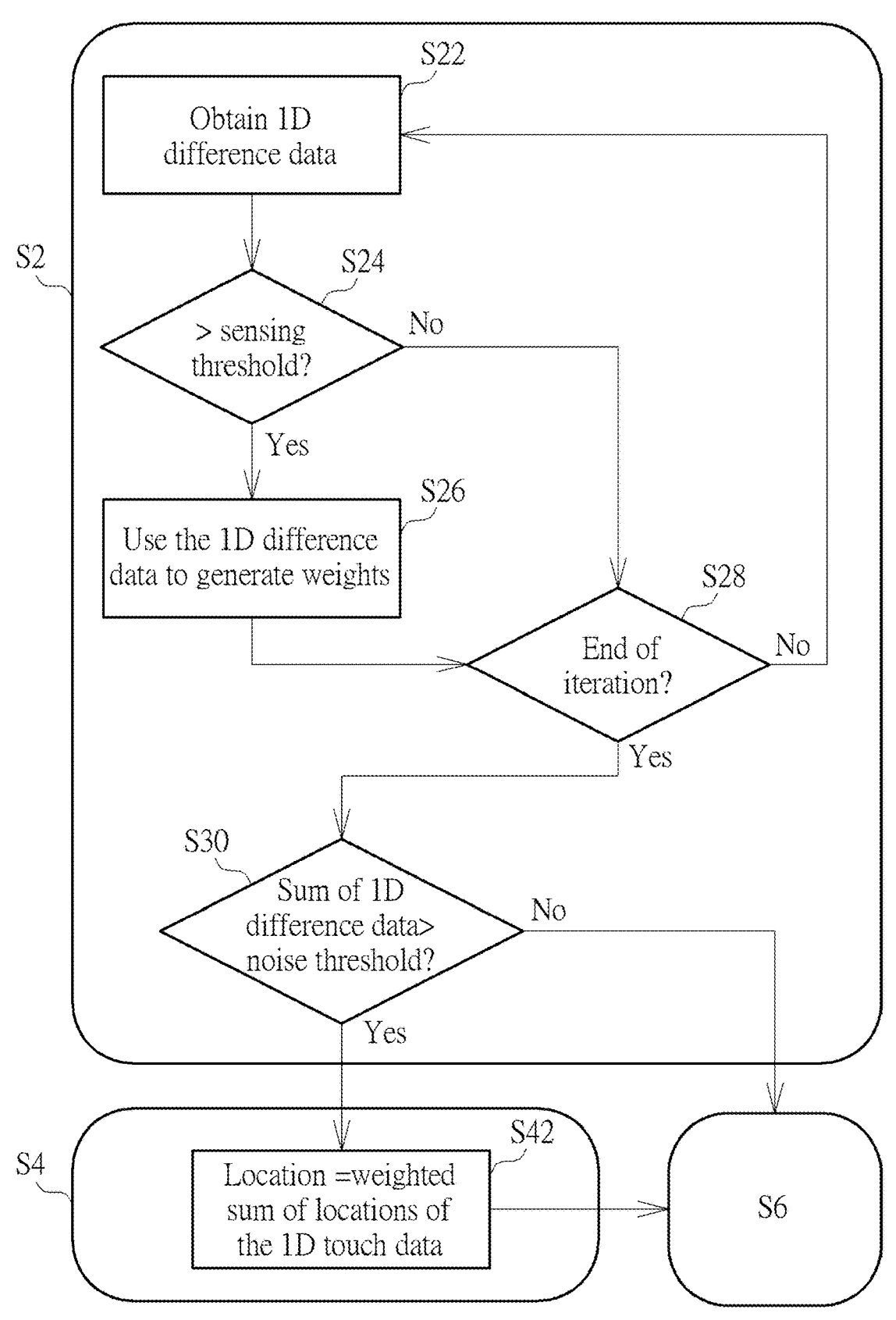
Figure 10:
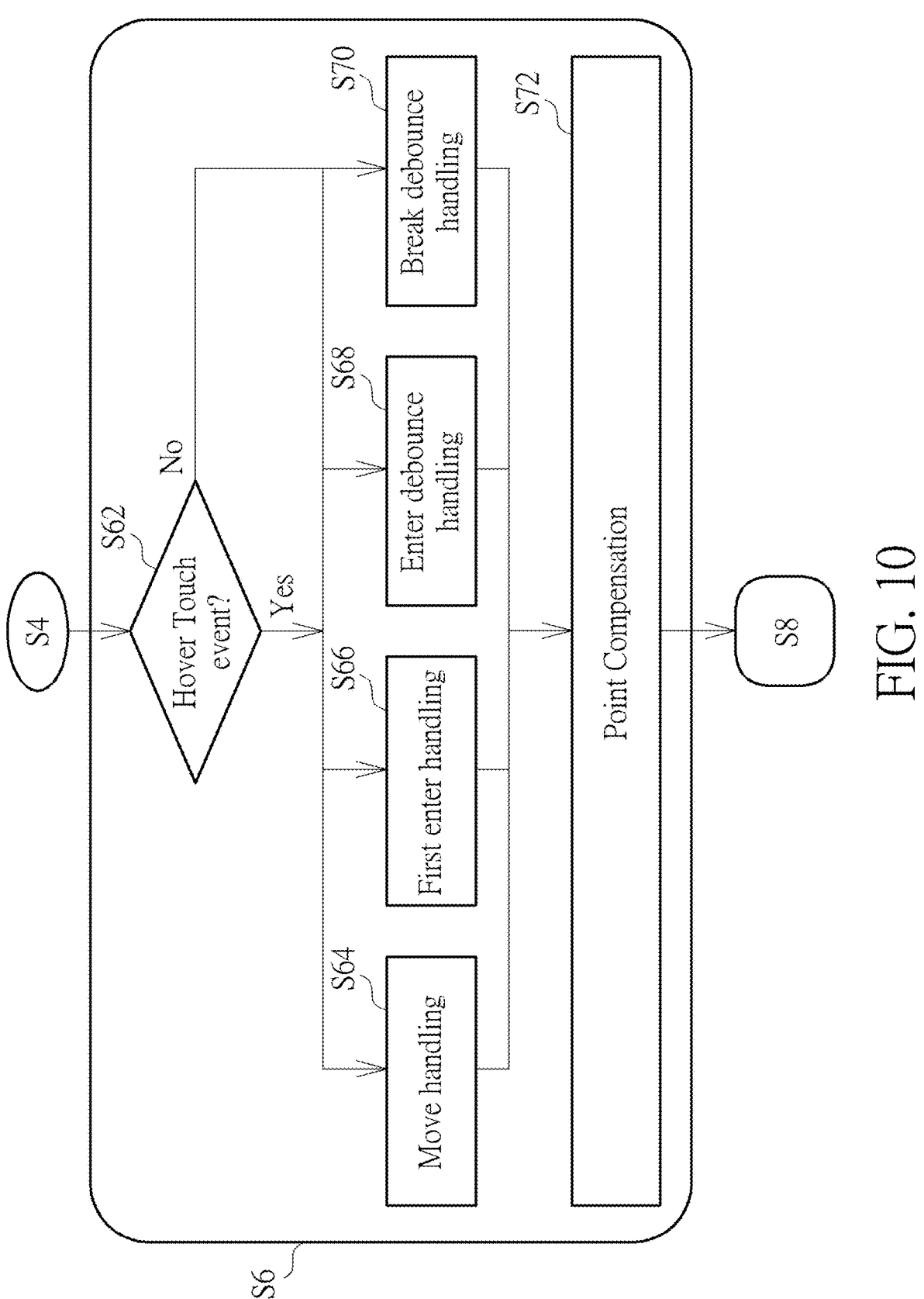

FIGS. 8 to 10 are flowcharts of methods for sensing the hover touch event T1. FIG. 8 is a flowchart of a sensing method 8. The method 8 includes Steps S2 to S8. Any reasonable step change or adjustment is within the scope of the present disclosure. FIG. 9 details Steps S2 and S4 of FIG. 8, while FIG. 10 details Step S6 of FIG. 8.

Steps S2 to S8 are detailed as follows:

S2: Identify a hover touch event according to the touch data from the touch panel;

S4: Compute the location of the hover touch event;

S6: Track the movement of the hover touch event to generate the locations over time and/or deduce hover touch commands;

S8: Perform data processing according to the locations and/or the hover touch commands; go to Step S2;

In Step S8, the data processing may be tailored to specific applications such as user interfaces, cursor control, object manipulation, handwriting, drawing, gesture recognition, data input, and other applications. The result of the data process may be shown on the display panel 500.

As shown in FIG. 9, Steps S2 to S4 are detailed as follows:

S22: For each piece of 1D touch data generated by the touch panel 200, the control circuit 100 obtains a corresponding piece of 1D difference data based on the 1D touch data and baseline noise;

S24: The control circuit 100 determines if the 1D difference data is greater than the sensing threshold? If so, go to Step S26; If not, go to Step S28;

S26: The control circuit 100 adds the 1D difference data into a set of 1D difference data, and normalizes each member in the set of 1D difference data to generate respective weights;

S28: The control circuit 100 determines if the 1D difference data corresponds to a last piece of the 1D touch data generated by the touch panel 200? If so, go to Step S30. If not, go to Step S22;

S30: The control circuit 100 determines if sum of the K pieces of 1D difference data is greater than the noise threshold? If not, go to Step S6. If so, go to Step S42;

S42: The control circuit 100 calculates weighted sum of locations of the K pieces of 1D difference data according to the K weights; go to Step S6.

Details of Steps S22 to S42 have been discussed in the preceding paragraph and will not be repeated here.

As shown in FIG. 10, Step S6 is detailed as follows:

S62: The control circuit 100 determines if the hover touch event T1 has actually taken place on the touch panel 200? If so, proceed to Steps S64, S66, S68, and S70; If not, go to Steps S70;

S64: The control circuit 100 performs movement handling related to the hover touch event T1; go to Step S72;

S66: The control circuit 100 performs first enter handling; go to Step S72;

S68: The control circuit 100 performs enter debounce handling; go to Step S72;

S70: The control circuit 100 performs break debounce handling; go to Step S72;

S72: The control circuit 100 performs point compensation; go to Step S8.

In Step S64, the movement handling includes distance and direction determination, trigger point generation and jitter protection. If the hover touch event T1 is a sliding hover operation, the control circuit 100 identifies the distance, direction and trigger point of the sliding hover operation according to the location from Step S42. If the hover touch event T1 is a hover control operation, the control circuit 100 performs the jitter protection to allow the hover touch event T1 to appear as stabilized and non-drifting on the display panel 500.

In Step S66, the control circuit 100 withholds the triggered locations until confirming that the hover touch event T1 is valid.

In Step S68, the control circuit 100 confirms if the hover touch event T1 is valid. For example, if the number of frames containing the hover touch event T1 is greater than a frame number threshold (e.g., 2), the control circuit 100 may determine that the hover touch event T1 is valid. If the number of frames containing the hover touch event T1 is less than the frame number threshold (e.g., 2), the control circuit 100 may determine that the hover touch event T1 is invalid.

In Step S68, if the hover touch event T1 is currently overwriting an older one (e.g., hover sliding operation has changed from sliding left to right to sliding right to left), the control circuit 100 may perform break debounce handling to process the location calculated in Step S42 as a new hover touch event T1.

In Step S72, The control circuit 100 utilizes the point compensation algorithm to compensate for the display location.

The sensing device and sensing method provide numeral means to scan the touch panel and generated 1D touch data for sensing hover touch events. Therefore, a normal touch event and a hover touch event may be differentiated on the same sensing device 1, and sensing distance and accuracy for identifying the hover touch event may be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensing device comprising:
a touch panel comprising touch sensors to generate touch data upon being scanned, the touch sensors being arranged in a matrix of x columns and y rows, x and y being positive integers exceeding 1, the touch data comprising two-dimensional (2D) touch data; and
a control circuit coupled to the touch panel to scan the touch panel to generate the 2D touch data and differentiate between a normal touch event and a hover touch event according to the touch data;
wherein the control circuit scans a touch sensor of the touch sensors multiple times to generate raw touch data of the touch sensor;
the control circuit comprises:
an analog summing circuit to accumulate the raw touch data of the touch sensor to generate analog touch data of the touch sensor during a scan term; and
a digital summing circuit coupled to the analog summing circuit to accumulate the analog touch data of the touch sensor repeatedly to generate 2D touch data of the touch sensor during the scan term.

2. The sensing device of claim 1, wherein the control circuit scans touch sensors in a column of the x columns to generate 2D touch data of the column, accumulates the 2D touch data of the column to generate one-dimensional (1D) touch data of the column, and identifies the hover touch event according to 1D touch data of the x columns.

3. The sensing device of claim 2, wherein:
the control circuit computes 1D difference data of the column according to the 1D touch data of the row and a baseline noise;
the control circuit compares 1D difference data of the x columns with a sensing threshold to generate comparison results;
the control circuit selectively normalizes the 1D difference data of the x columns according to the comparison results; and
the control circuit generates a location of the hover touch event according to the normalized 1D difference data.

4. The sensing device of claim 3, wherein the control circuit further determines that the hover touch event corresponds to a hover control operation, according to locations of the hover touch event.

5. The sensing device of claim 3, wherein the control circuit further determines that the hover touch event corresponds to a hover sliding operation, according to a distance of a trajectory connecting locations of the hover touch event over consecutive frame periods, a distance threshold, and a direction of the trajectory.

6. The sensing device of claim 1, wherein the control circuit scans touch sensors in a row of the y rows to generate 2D touch data of the row, accumulates the 2D touch data of the row to generate one-dimensional (1D) touch data of the row, and identifies the hover touch event according to 1D touch data of the y rows.

7. The sensing device of claim 6, wherein:
the control circuit computes 1D difference data of the row according to the 1D touch data of the row and a baseline noise;
the control circuit compares 1D difference data of the y rows with a sensing threshold to generate comparison results;
the control circuit selectively normalizes the 1D difference data of the y rows according to the comparison results; and
the control circuit generates a location of the hover touch event according to the normalized 1D difference data.

8. The sensing device of claim 1, wherein:
the touch panel is fully scanned in a frame period comprising N scan terms, N being a positive integer exceeding 1;
the touch data further comprise 1D touch data; and
the control circuit performs at least one 1D scan on the touch sensors to generate the 1D touch data during at least one scan term of the N scan terms, and performs 2D scans on the touch sensors to generate the 2D touch data during remaining scan terms of the N scan terms.

9. The sensing device of claim 8, wherein the at least one 1D scan is evenly distributed among the 2D scans.

10. The sensing device of claim 8, wherein the at least one 1D scan is alternated with the 2D scans.

11. The sensing device of claim 8, wherein:
during each of the at least one 1D scan, touch sensors in each column of the x columns are merged together to sense 1D touch data of each column, and
the control circuit identifies the hover touch event according to 1D touch data of the x columns.

12. The sensing device of claim 8, wherein:
during each of the at least one 1D scan, touch sensors in each row of the y rows are merged together to sense 1D touch data of each row, and
the control circuit identifies the hover touch event according to 1D touch data of the y rows.

13. A sensing method comprising:
a touch panel generating touch data upon being scanned, wherein the touch panel comprises touch sensors arranged in a matrix of x columns and y rows, x and y being positive integers exceeding 1, the touch data comprising two-dimensional (2D) touch data; and
a control circuit scanning the touch panel to generate the 2D touch data and differentiating between a normal touch event and a hover touch event according to the touch data;
wherein scanning the touch panel to generate the 2D touch data comprises:
the control circuit scanning a touch sensor of the touch sensors multiple times to generate raw touch data of the touch sensor;
an analog summing circuit of the control circuit accumulating the raw touch data of the touch sensor to generate analog touch data of the touch sensor during a scan term; and
a digital summing circuit of the control circuit accumulating the analog touch data of the touch sensor repeatedly to generate 2D touch data of the touch sensor during the scan term.

14. The sensing method of claim 13, wherein the control circuit scanning the touch panel and differentiating between the normal touch event and the hover touch event according to the touch data comprises:
the control circuit scanning touch sensors in a column of the x columns to generate 2D touch data of the column;
the control circuit accumulating the 2D touch data of the column to generate one-dimensional (1D) touch data of the column; and
the control circuit identifying the hover touch event according to 1D touch data of the x columns.

15. The sensing method of claim 14, wherein the control circuit identifying the hover touch event according to the 1D touch data of the x columns comprises:
the control circuit computing 1D difference data of the column according to the 1D touch data of the column and a baseline noise;
the control circuit comparing 1D difference data of the x columns with a sensing threshold to generate comparison results;
the control circuit selectively normalizing the 1D difference data of the x columns according to the comparison results; and
the control circuit generating a location of the hover touch event according to the normalized 1D difference data.

16. The sensing method of claim 15, further comprising the control circuit determining that the hover touch event corresponds to a hover control operation according to locations of the hover touch event.

17. The sensing method of claim 15, further comprising the control circuit determining that the hover touch event corresponds to a hover sliding operation according to a distance of a trajectory connecting locations of the hover touch event over consecutive frame periods, a distance threshold, and a direction of the trajectory.

18. The sensing method of claim 15, wherein the control circuit scanning the touch panel and differentiating between the normal touch event and the hover touch event according to the touch data comprises:
the control circuit scanning touch sensors in a row of the y rows to generate 2D touch data of the row;
the control circuit accumulating the 2D touch data of the row to generate 1D touch data of the row; and
the control circuit identifying the hover touch event according to 1D touch data of the y rows.

19. The sensing method of claim 18, wherein the control circuit identifying the hover touch event according to 1D touch data of the y rows comprises:
the control circuit computing 1D difference data of the row according to the 1D touch data of the row and a baseline noise; and
the control circuit comparing 1D difference data of the y rows with a sensing threshold to generate comparison results;
the control circuit selectively normalizing the 1D difference data of the y rows according to the comparison results; and
the control circuit generating a location of the hover touch event according to the normalized 1D difference data.

20. The sensing method of claim 13, wherein:
the touch panel is fully scanned in a frame period comprising N scan terms, N being a positive integer exceeding 1;
the touch data further comprise 1D touch data; and
the control circuit scanning the touch panel comprises:

the control circuit performing at least one 1D scan on the touch sensors to generate the 1D touch data during at least one scan term of the N scan terms; and the control circuit performing 2D scans on the touch sensors to generate the 2D touch data during remaining scan terms of the N scan terms.

21. The sensing method of claim 20, wherein the at least one 1D scan is evenly distributed among the 2D scans.

22. The sensing method of claim 20, wherein the at least one 1D scan is alternated with the 2D scans.

23. The sensing method of claim 20, wherein the control circuit performing the at least one 1D scan on the touch sensors to generate the 1D touch data during the at least one scan term of the N scan terms comprises:

during each of the at least one 1D scan, the control circuit merging touch sensors in each column of the x columns to sense 1D touch data of each column; and the control circuit identifying the hover touch event according to 1D touch data of the x columns.

24. The sensing method of claim 20, wherein the control circuit performing the at least one 1D scan on the touch sensors to generate the 1D touch data during the at least one scan term of the N scan terms comprises:

during each of the at least one 1D scan, the control circuit merging touch sensors in each row of the y rows together to sense 1D touch data of each row; and the control circuit identifying the hover touch event according to 1D touch data of the y rows.

25. A sensing device comprising:

a touch panel comprising touch sensors to generate touch data upon being scanned, the touch sensors being arranged in a matrix of x columns and y rows, x and y being positive integers exceeding 1; and a control circuit coupled to the touch panel to scan the touch panel and differentiate between a normal touch event and a hover touch event according to the touch data;

wherein:

the touch panel is fully scanned in a frame period comprising N scan terms, N being a positive integer exceeding 1;

the touch data comprise 1D touch data and 2D touch data;

the control circuit performs at least one 1D scan on the touch sensors to generate the 1D touch data during at least one scan term of the N scan terms, and performs 2D scans on the touch sensors to generate the 2D touch data during remaining scan terms of the N scan terms; and the at least one 1D scan is evenly distributed among the 2D scans.

\* \* \* \* \*